United States Patent [19]

Hanaway

[11] Patent Number: 5,051,002

[45] Date of Patent: Sep. 24, 1991

[54] GUIDE SLEEVE, GUIDE POST AND MODIFIED BALL BEARING ASSEMBLY

[76] Inventor: Ronald L. Hanaway, 30210 E. Eight Mile Rd., Farmington Hills, Mich. 48236

[21] Appl. No.: 645,745

[22] Filed: Jan. 25, 1991

[51] Int. Cl.⁵ ............................................. F16C 29/04
[52] U.S. Cl. ......................................... 384/49; 384/30
[58] Field of Search ................................ 384/48–51, 384/56, 59

[56] References Cited

U.S. PATENT DOCUMENTS

| | | | |
|---|---|---|---|
| 2,846,278 | 8/1958 | Blazek | 384/30 |
| 2,987,348 | 6/1961 | Blazek | 384/30 |
| 3,092,425 | 6/1963 | Conner | 384/30 |
| 3,514,166 | 5/1970 | Coley | 384/49 |
| 4,648,727 | 3/1987 | O'Neil et al. | 384/49 |
| 4,664,534 | 5/1987 | Hanaway | 384/49 |

Primary Examiner—Thomas R. Hannon
Attorney, Agent, or Firm—Dykema Gosset

[57] ABSTRACT

In combination, a guide post having a longitudinal slot and a ball bearing cage adjustably receiving the post and adapted for relative longitudinal and rotary movements, there being an internal annular recess in said cage inwardly of one end. A truncated roller bearing with opposed hemispherical surfaces and opposed flat sides is guidably positioned within the slot with the roller bearing maintaining a rolling point contact with the bottom wall of the slot and with the roller flat sides loosely and slidably registerable with the side walls of the slot. One of the hemispherical surfaces of the bearing being positioned and retained within an internal annular recess within the ball cage. A fastener within the profile of the guide post adjacent one end of the longitudinal slot traps the roller within the longitudinal slot and ball cage.

8 Claims, 1 Drawing Sheet

GUIDE SLEEVE, GUIDE POST AND MODIFIED BALL BEARING ASSEMBLY

FIELD OF INVENTION

The present invention relates to a guide sleeve, guide post and modified bearing assembly for maintaining an alignment of a pair of parallel plates during relative reciprocal movements and wherein upper and lower die shoes may be mounted upon said plates.

BACKGROUND OF THE INVENTION

In the guide sleeve, guide post and bearing assembly of U.S. Pat. 4,664,534 dated May 12, 1987, of Applicant's Assignee, one disadvantage was that at times portions of the set screw 51 for trapping the roller 41 within the annular recess 43 of the ball cage 35 had a limited mechanical interference with the adjacent roller 41 as it rolled along guide slot 33.

Further in seeking an entry of the roller 41, FIG. 7, of that Patent, into the interior of the ball cage 35 for entry into the recess 43 there were difficulties in broaching the exterior corners 53 to the radial opening when inserting the roller 41, and the subsequent threading of the bore 49 for insertion of the set screw 51 into the ball retainer or cage so as to trap the roller within the cage recess 43.

Further difficulties were involved in the engineering of a special type of roller 41 with rounded corners at 47, FIG. 6, such as would permit its insertion radially into the bore 49 and ultimately into the recess 43 to prevent any binding of portions of the roller 41 with respect to the cage during relative rotary movements of the cage with respect to the roller as constrained against rotation within the slot 33 of the post 29.

SUMMARY OF THE INVENTION

An important feature of the present invention is to eliminate any machining of the ball cage in connection with the insertion and anchoring of a roller bearing within the annular recess therein.

An important feature is to provide in combination a guide post having a longitudinal axis and a longitudinal slot substantially throughout its length having a bottom wall and opposed side walls and a cylindrical ball bearing cage having a coaxial longitudinal axis adjustably receiving the post adapted for relative longitudinal and rotary movements thereon and with the cage having an internal annular recess. A truncated roller bearing having opposed hemispherical surfaces and additionally opposed flatened sides is guidably positioned within the guide post slot. The roller maintains a rolling point contact with the bottom wall of the slot and the roller flat sides are loosely and slidably registerable with the side walls of the slot during relative longitudinal movements of the ball cage with respect to the post. The truncated roller is slidably nested within an annular recess in the ball cage.

As another feature, the roller is alternately registerable with opposite ends of the longitudinal slot limiting rectilinear movement of the ball cage relative to the guide post.

As another feature, one of the hemispherical portions of the roller is positioned within the annular cage recess. The cage is adapted for rotary sliding movement relative to said roller in a direction at right angles to the longitudinal axis of the guide post.

As still another feature, there is provided a fastener means within the guide slot adjacent one end of the longitudinal slot for trapping the roller within the slot and within the internal annular recess within the ball cage.

As still another feature, there is provided at one end of the guide post slot a roller clearance pocket together with a fastener means including a set screw which is threaded into the guide post at right angles to its axis normally blocking movement of the roller into the clearance pocket. This traps the roller within the guide post slot and within the ball bearing retainer.

As another feature, upon movement of the cage relative to the guide post exposing the set screw, with its removal entry of the roller into the clearance recess is permitted providing for disassembly of the cage from the roller and guide post.

These and other features and objects will be seen from the following specification and claims in conjunction with the appended drawing.

THE DRAWING

It will be understood that the above drawing illustrates merely a preferred embodiment of the invention, and that other embodiments are contemplated within the scope of the claims hereafter set forth.

DETAILED DESCRIPTION OF AN EMBODIMENT OF THE INVENTION

Figure 1:
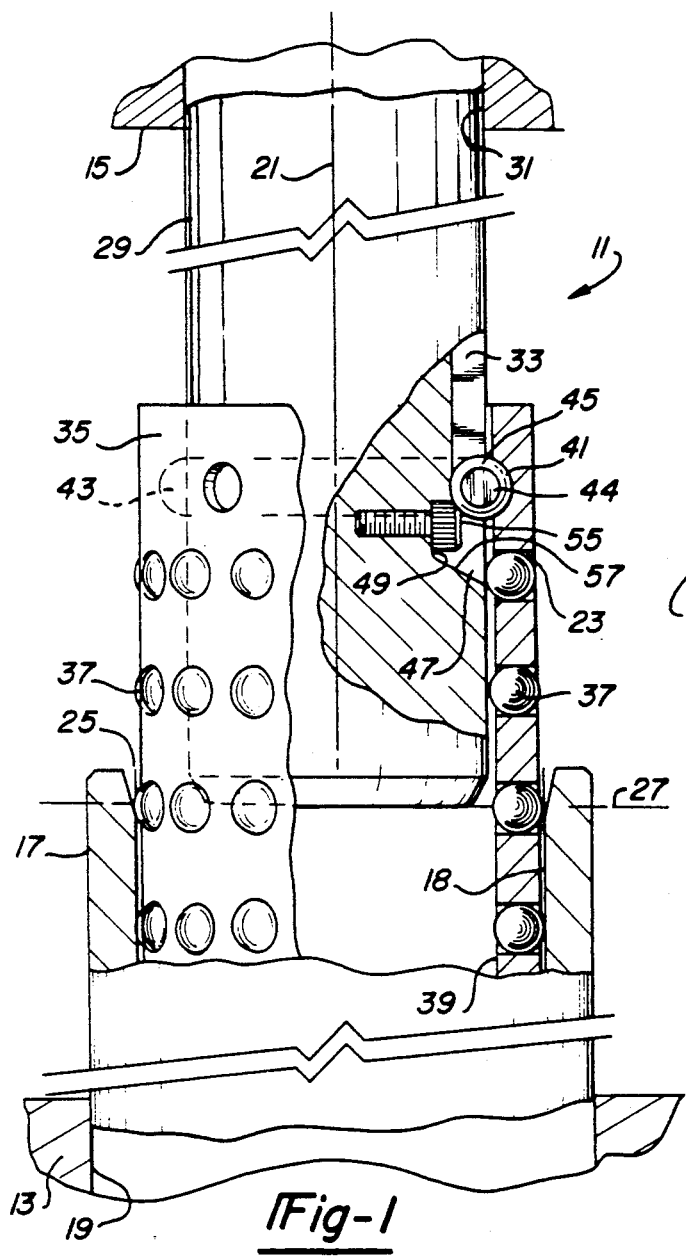
FIG. 1 is a fragmentary partly broken away and sectioned elevational view of the present guide sleeve, guide post and modified bearing assembly as used in conjunction with a pair of relatively movable upper and lower die shoes, fragmentarily shown.

Referring to the drawing, FIG. 1, the illustrative die set with guide sleeve, guide post and modified bearing assembly is generally indicated at 11, and includes lower die shoe 13, fragmentarily shown, Overlying the lower die shoe is an upper die shoe 15, fragmentarily shown, which is adapted for vertical reciprocal movements with respect to lower die show 13 and with respect to a die set mounted upon the corresponding die shoes in a conventional manner, not shown.

The present guide post, guide sleeve and bearing assembly includes the open ended guide sleeve 17, fragmentarily shown, having a cylindrical bore 18 and press fitted in an upright position within a corresponding aperture 19 in the lower die shoe 13.

Sleeve 17 has a central longitudinal axis 21 and is adapted to receive a corresponding guide post 29 having a similar longitudinal axis 21. The upper end of guide post 29, fragmentarily shown, is press fitted within aperture 31 within upper die shoe 15.

An elongated guide slot 33, is fragmentarily shown, formed along substantially the length of post 29 on its exterior. A second guide slot 33 may be formed upon the opposite side of said post if desired. The cylindrical ball cage 35 or ball bearing retainer, in the illustrative embodiment includes a series of longitudinally spaced circles of apertures 23 within which are positioned and entrapped or loosely retained a corresponding plurality of spaced ball bearings 37. These are arranged in longitudinally spaced circles so as to uniformly project through the body of the ball cage exteriorly and interiorly thereof, FIG. 1.

Within the ball bearing retainer 35 adjacent its bore 39 there is provided an internal annular recess 43 inwardly of one end thereof which receives truncated roller bearing 41. A portion of the truncated bearing 41 guidably projects into post slot 33.

Figure 2:
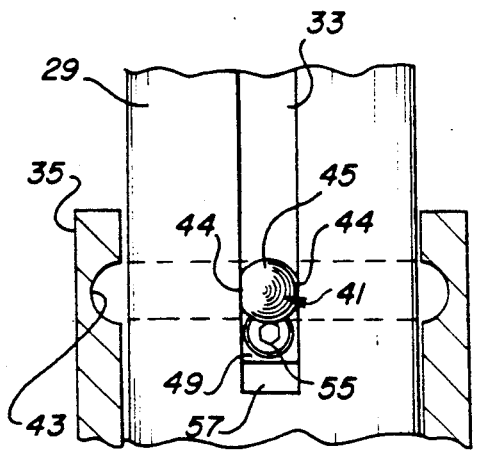
FIG. 2 is a fragmentary right side elevational view thereof with the cage partly broken away and sectioned.

The present engineered truncated roller 41 has a pair of opposed machined flat surfaces 44, FIG. 2, and a pair of opposed hemispherical surfaces 45.

In operation the present sleeve 17, post 29 and bearing assembly 35 is interposed with respect to the upper and lower die shoes 15 and 13, respectively. Slot 33 within the guide post 29 cooperatively receives the truncated roller bearing 41 limiting relative longitudinal movements of the ball bearing cage 35 along the length of post 29.

With the roller 41 positioned within slot 33 which has a bottom wall and a pair of opposed side walls, said roller maintains a rolling point contact with the bottom wall of slot 33. At the same time the roller opposed flat sides 44 loosely and slidably register with the opposed side walls of slot 33.

During conventional reciprocal movements of the post 29 with respect to sleeve 17 and with the ball cage 35 mounted upon the post and interposed between the post and sleeve 17, longitudinal reciprocal movement of the post effects corresponding longitudinal movements of ball cage 35 with respect to sleeve 17.

While the truncated roller 41 is trapped within slot 33, ball cage 35 is not restrained against rotation with respect to guide post 29 and guide sleeve 17 and is therefore capable of relative rotary movements with respect to both the guide post 29 and sleeve 17.

The ball cage is free for such relative rotary movements with respect to the post and sleeve when the post and sleeve are disengaged so that there is no preload. After each separation there is an opportunity for relative rotation.

By providing a ball cage which is free for relative rotation, tracking of the balls 37 in the cage with respect to the post and sleeve is reduced and friction is minimized.

In the illustrative embodiment, bore 18 of sleeve 17 is slightly over size with respect to the maximum diameter of the ball bearing assembly 35, so that it is free to enter the sleeve 17 during the down stroke.

The upper end of the sleeve 17 is tapered outwardly as at 25 and transversely of said sleeve there is schematically shown a preload line 27. There is an oversize relation of the ball bearing assembly after the cage and guide post has lowered into the sleeve of about 0.001" with respect to sleeve 17. Thus, there is a preload of the balls with respect to said sleeve.

As an improvement and simplification over the disclosure of U.S. Pat. No. 4,664,534 there is provided the present improved and engineered truncated roller 41, FIGS. 1–4.

Figure 4:
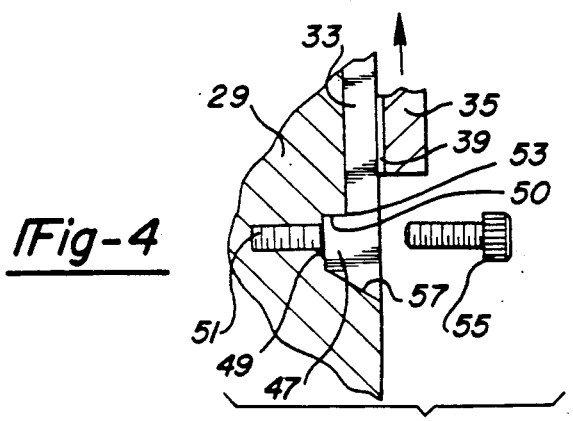
FIG. 4 is a fragmentary sectioned view with the cage elevated and the set screw and roller bearing removed.
Figure 3:
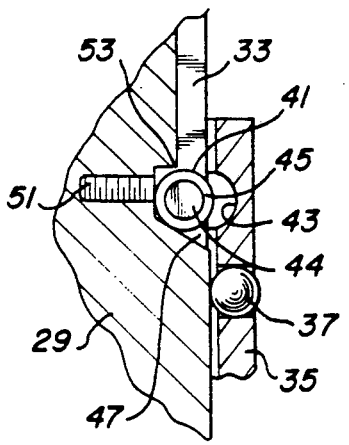
FIG. 3 is a fragmentary partly broken away section corresponding to the upper portion of FIG. 1 with the set screw removed and with the roller bearing within a clearance pocket.

As viewed in FIGS. 3 and 4, in operation the roller 41 has an instantaneous point of contact upon one side with the bottom wall of the post slot 33 as the roller 41 moves along the length of slot 33 during relative reciprocal movements of guide post 29 with respect to sleeve 17. This reduces friction to a minimum with such instantaneous point contact of one of the hemispherical opposed portions 45 of the roller in engagement with the bottom wall of slot 33.

At the same time, the opposed flatened walls 44 of the truncated roller are arranged adjacent to and move along the opposed side walls of the correspondence longitudinal slot 33.

Shown at one end, preferably the lower end of guide slot 33 on post 29 is roller entry clearance pocket 47 which includes a bottom wall 49, FIG. 4, which is displaced inwardly from the bottom wall of slot 33 and parallel thereto. Clearance pocket 47 also includes the radial cut away portion 50 which extends at right angles to axis 21 and to the length of slot 33 and defines with the bottom wall of slot 33 cam corner 53.

Extending from the bottom wall 49 of the clearance pocket 47 is a threaded bore 51 which threadedly receives the socket headed set screw 55, FIGS. 1 and 4.

Bottom wall 49 terminates in the downwardly and outwardly inclined ramp 57 which extends to the outer surface of guide post 29 as in FIGS. 1, 3 and 4.

As shown in FIG. 1, the function of the set screw 55 when assembled at the bottom of the clearance pocket 47 is to trap the truncated roller 41 within slot 33 against separation from the post slot or separation from within the internal annular recess 43 within ball cage 35.

For assembly or disassembly of the ball cage 35 with respect to the post 29, the guide post 29 is separated from bushing 17, or axially elevated therefrom. To disassemble the ball cage it is first necessary to remove set screw 55.

This can be accomplished by manually elevating ball cage 35 on the post 27, FIG. 4, to such point as to expose the outer end of the set screw 55.

Once the set screw 55 has been unthreaded, a return movement of the ball cage 35 permits the truncated roller 41 to move into the roller entry clearance pocket 47, FIG. 3. At this time the ball cage 35, fragmentarily shown in FIG. 3, may be withdrawn from the guide post 29. At the same time the roller must be retained for subsequent use.

For reassembly the truncated roller 41 is initially positioned within the roller entry clearance pocket 47 as in FIG. 3. As the roller 41 moves upwardly it engages the corner 53 and is further camed into the annular recess 43 upon the interior of the bearing cage 35. Again with the truncated roller trapped within the longitudinal groove 33 as well as within the annular recess 43, the cage 33 must be elevated sufficiently so as to be able to manually assemble the set screw 55 into the bore 51 of FIG. 4. When fully assembled the set screw will thereafter trap the truncated roller 41 against dropping down into clearance pocket 47, FIG. 1.

Having described my invention, reference should now be had to the following claims:

I claim:

1. In combination, a guide post having a longitudinal axis and a longitudinal slot substantially throughout its length;
   a cylindrical ball bearing cage having a co-axial longitudinal axis adjustably receiving said post, and adapted for relative longitudinal and rotary movements thereon;
   said bearing cage mounting a plurality of spaced circularly arranged ball bearings extending substantially the length of said cage and projecting inwardly and outwardly thereof, respectively, there being an internal annular recess in said cage inwardly of one end thereof;

a truncated roller bearing having opposed hemispherical surfaces and opposed flat sides, guidably positioned within said longitudinal slot with the roller bearing maintaining a rolling point contact with the bottom of said slot and with the roller flat sides loosely and slidably registerable with opposed sides of said slot;

said roller being alternately registerable with opposite ends of said longitudinal slot, limiting rectilinear movement of the ball cage relative to said post;

one of the hemispherical portions of said roller being positioned within the cage recess;

said cage including its recess being adapted for rotary sliding movement relative to said roller upon said axis; and fastener means within said guide post adjacent one end of its longitudinal slot, trapping said roller therein and within said ball cage.

2. In the combination of claim 1, there being a roller entry clearance pocket within said guide post at said one end of and communicating with its longitudinal slot;

further comprising said fastener means including a set screw threaded into said guide post at right angles to said axis, normally blocking movement of said roller into said clearance pocket.

3. In the combination defined in claim 2, further comprising movement of said cage relative to said guide post exposing said set screw;

removal of said set screw permitting entry of said roller into said clearance recess and disassembly of said cage from said roller and guide post.

4. In the combination defined in claim 3, further comprising said clearance pocket having a bottom wall parallel to and arranged inwardly of the bottom wall of said slot;

said bottom wall terminating in an outwardly inclined roller ramp extending to the exterior of said guide post.

5. In the combination defined in claim 3, further comprising said roller clearance pocket including a radial wall at right angles to the bottom wall of said longitudinal slot defining a camcorner therebetween;

reassembly of said roller into said clearance pocket and on relative movement of said cage and roller, said roller engaging said camcorner and guided into said cage recess and longitudinal slot.

6. In the combination defined in claim 3, further comprising said clearance pocket having a bottom wall parallel to and arranged inwardly of the bottom wall of said slot;

said bottom wall terminating in an outwardly extending wall merging with the exterior of said guide post.

7. In the combination defined in claim 1, further comprising a guide sleeve having a coaxial longitudinal axis, with said ball cage and guide post projected into said sleeve for relative longitudinal movements and for rotary movements of said cage relative to said sleeve.

8. In the combination defined in claim 7, further comprising said guide post and sleeve being upright and at their ends projected into and respectively secured within the upper and lower relatively movable die shoes of a die set assembly.

* * * * *